Feb. 5, 1952   H. J. BALDWIN ET AL   2,584,322
MECHANIZED SEED DISTRIBUTOR
Filed Dec. 2, 1948   3 Sheets-Sheet 1
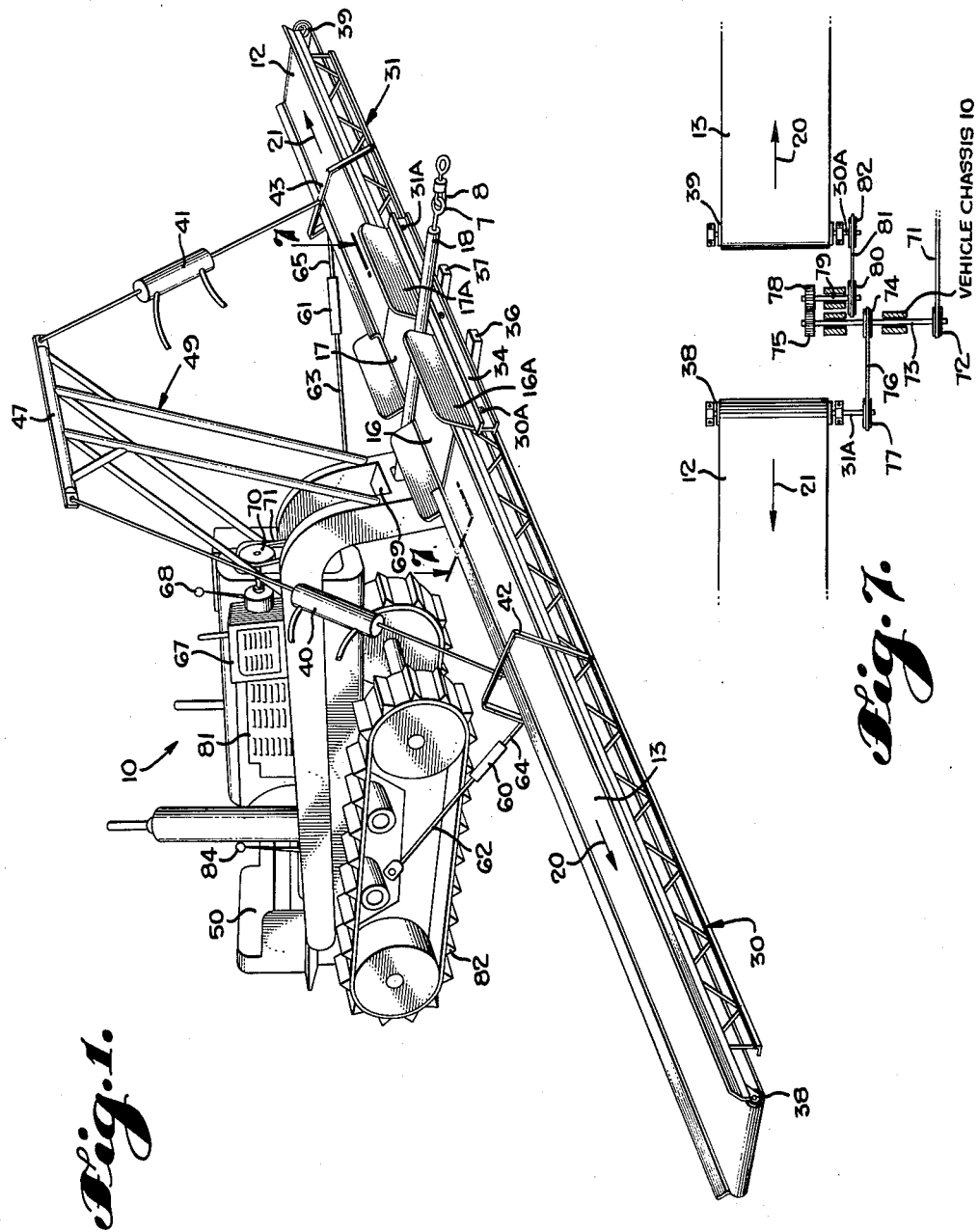
INVENTORS
HENRY J. BALDWIN
ARTHUR N. BALDWIN
TETSUO MIHARA
BY Lyon & Lyon
ATTORNEYS

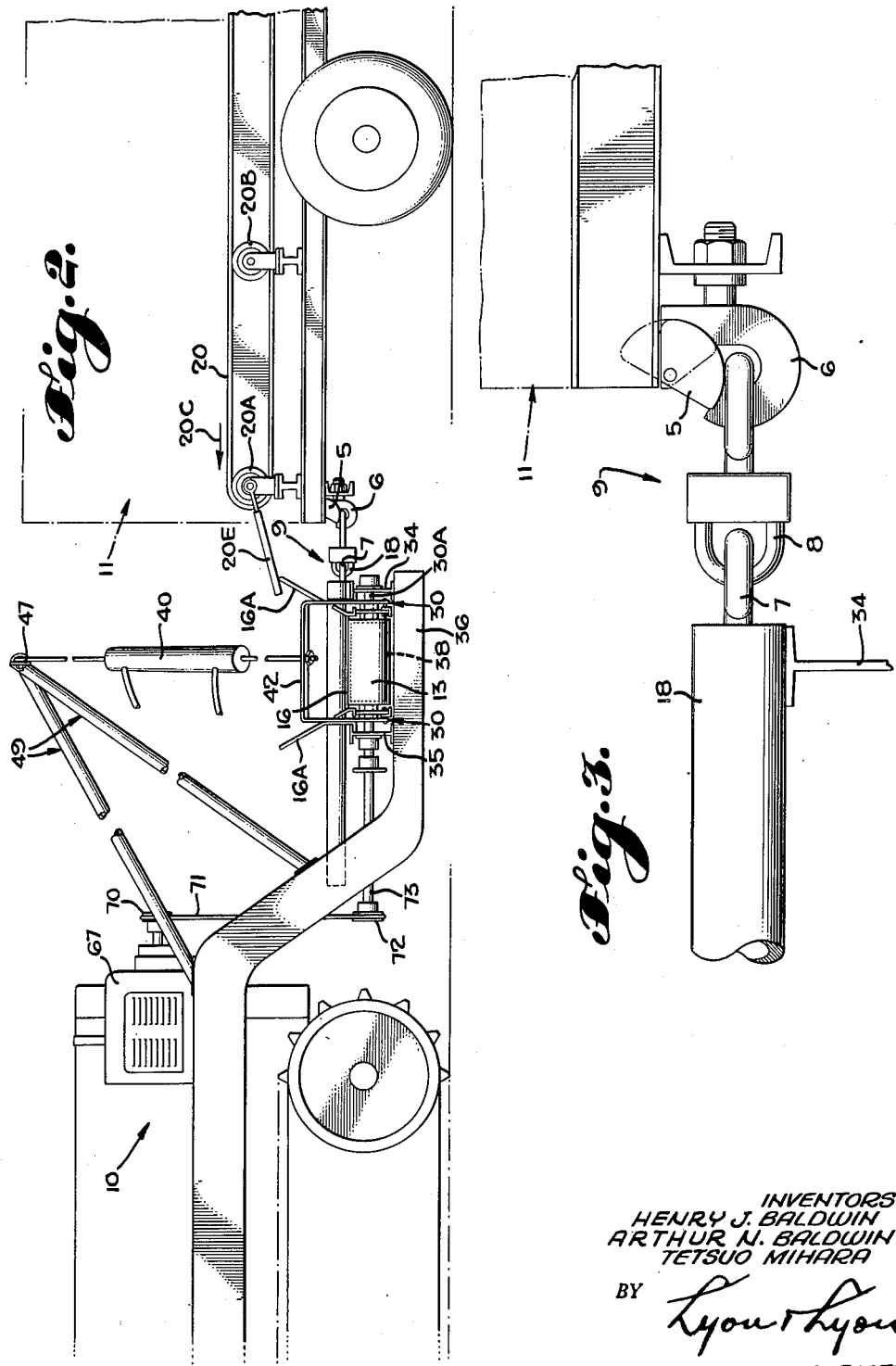

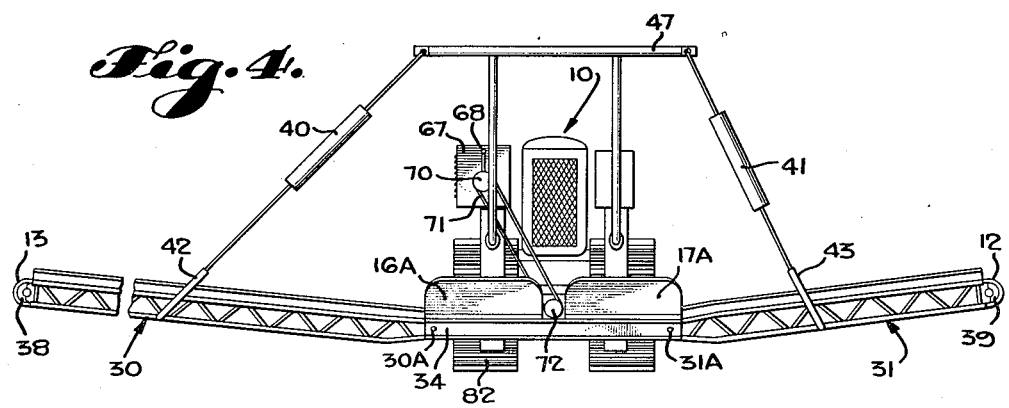
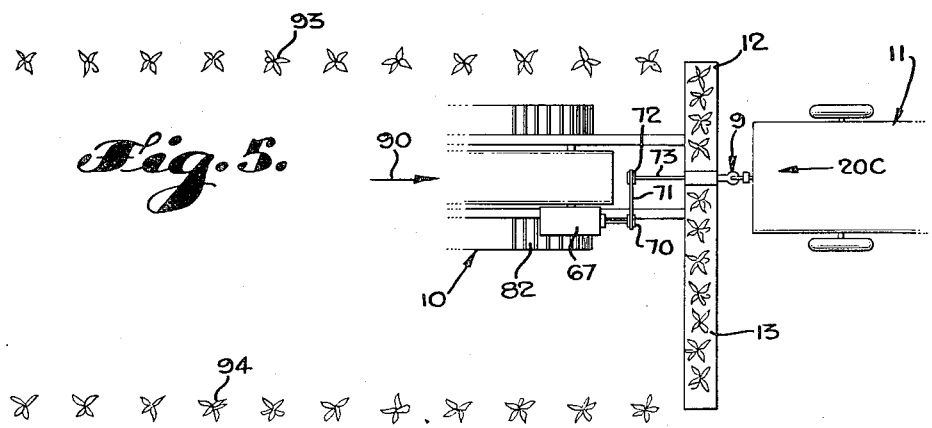
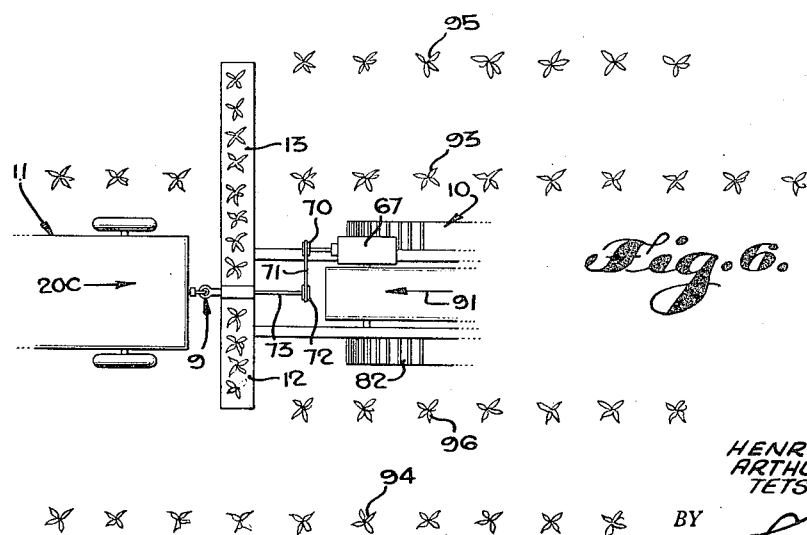

Patented Feb. 5, 1952

2,584,322

UNITED STATES PATENT OFFICE 2,584,322

MECHANIZED SEED DISTRIBUTOR

Henry J. Baldwin, Arthur N. Baldwin, and Tetsuo Mihara, Paia, Territory of Hawaii, assignors to Maui Pineapple Company, Ltd., Honolulu, Territory of Hawaii, a corporation of Hawaii Application December 2, 1948, Serial No. 63,082

9 Claims. (Cl. 198—233)

The present invention relates to an improved method and apparatus for gathering and distributing pineapple planting material.

According to conventional practice, planting material for pineapples consists of the gathering of slips or shoots from the growing plants; and, in accordance therewith, this is accomplished by the slips or shoots being cut, then collected or placed into bags which are carried to the edge of the field, and thereafter the bags are loaded onto trucks and taken to the field to be planted, the bags being carried manually to various portions of the field and the planting material in such bags then being scattered for the use of the planting crew.

It is quite apparent that such conventional practice requires a relatively large number of persons, time and repeated handlings.

It is, therefore, an object of the present invention to provide an improved method and apparatus for gathering and distributing planting material for the growth of pineapples characterized by their efficiency, simplicity, and the relatively small number of man-hours required to accomplish the intended purpose.

Another object of the present invention is to provide an improved apparatus for the purpose indicated, characterized by the fact that the mechanism for distributing the planting material may work in conjunction with a plurality of vehicles from and onto which the planting material is conveyed.

Yet another object of the present invention is to provide an improved apparatus for the purpose indicated, characterized by the fact that the apparatus in distributing the planting material may travel along the same path twice and yet service different planting areas in its repeated movement along such path.

Yet another object of the present invention is to provide an improved apparatus for the purpose indicated, characterized by its simplicity and ruggedness and ease of adjustment for travel over fields and over highways.

Yet another object of the present invention is to provide an improved planting material distributing system which is capable of using and operating in conjunction with component parts of the mechanized pineapple harvesting arrangement shown and described in the co-pending application of Bainbridge, et al., Serial No. 656,192, filed March 22, 1946, and now Patent No. 2,576,991 granted December 4, 1951, to thereby avoid duplication and effect a reduction in the number of component parts required in mechanized pineapple harvesting and planting systems.

The features of the present invention which are believed to be novel are set forth with particularity in the appended claims. This invention itself, both as to its organization and manner of operation, together with further objects and advantages, thereof, may be best understood by reference to the following description taken in connection with the accompanying drawings, in which:

Figure 1 is a perspective view showing some of the apparatus embodying the present invention.

Figure 2 is a view in side elevation of a portion of the apparatus shown in Figure 1 and associated truck coupled thereto in operative relationship with the apparatus shown in Figure 1.

Figure 3 is an enlarged elevation view of a portion of the apparatus shown in Figure 2.

Figure 4 is a view in front elevation of the apparatus shown in Figure 1, and

Figures 5 and 6 illustrate the manner in which the apparatus embodying the present invention may twice move over the same path and yet service different ground areas.

Figure 7 is a top plan view taken in the general direction indicated by the arrows 7—7 in Figure 1, with a portion of the apparatus thereof removed to illustrate a manner in which mechanical coupling of the two conveyor belts may be effected.

In accordance with the present invention, after the slips and shoots have been selected, they are loaded onto the vehicle 11, preferably, by using the harvestting apparatus described and claimed in the above-mentioned patent application, Serial Number 656,192. In such case, such harvesting apparatus passes through the field after the planting material, comprising such soots and slips, has been selected and such planting material is thrown onto the conveyor belt on such harvesting machine and loaded onto the truck 11 coupled thereto, the same as is done with the picked pineapple during the harvesting season.

The truck 11, thus loaded, is driven to the planting field and releasably coupled by coupling 9 to the planting material distributor 10 in the manner shown in Figure 2, such coupling 9 comprising a chain 8 permanently linked at one end thereof to an eye 7 on the end of the truck pushing arm 18 mounted on the distributor 10 with the other end of the chain 8 releasably attached to the hook 6 mounted on the truck 11 and normally retained in such hook 6 by the pivoted keeper 5. The truck 11 is thus normally pushed to the right, in Figure 2, through this coupling 9.

The truck 11, in this condition, is normally out of gear and its engine used to operate the floor or bed of the truck comprising an endless belt 20 upon which the planting material is disposed.

The mechanism for driving such endless belt 20 over the supporting rotatable rollers 20A, 20B, mounted on the chassis of the truck, may, as is well understood by those skilled in the art, be of conventional structure so that a detailed description of the same is not considered necessary here.

Upon movement of the endless belt 20 in the direction indicated by the arrow 20C, the planting material thereon falls onto the inclined loading platform 20E, pivotally mounted on the truck 11, and then onto the loading platforms 16, 17 on the distributor 10. The inclined platform 20E serves as a tail gate for the truck 11 when in transit and rests, when the truck is coupled to the distributor, against the upper edges of the upwardly inclined trough members 16A, 17A. These trough members 16A and 17A thus cooperate with the horizontally disposed loading platforms 16, 17 to form a receiving chute through which the rod 18 passes.

Planting material, thus loaded into such receiving chute and resting on the loading platforms 16, 17, is carried outwardly therefrom by the two oppositely traveling endless conveyor belts 12, 13. An important feature of the present invention is that the effective length of the belt 12 is substantially one-half of the length of belt 13 to obtain the beneficial results illustrated in Figures 5 and 6, described hereinafter.

The belts 12, 13 each pass over a plurality of supporting rollers 38, 39, the ends of which are rotatably mounted in suitable bearings disposed on the pivoted cantilever supporting frame 30 and 31, respectively. These frames 30, 31 are pivotally mounted on, for example, pivot shafts 30A, 31A respectively mounted on parallel spaced I beams 34, 35, which beams in turn are affixed to the forwardly extending chassis members 36, 37 of the distributor 10. These shafts 30A, 31A may also support the innermost ones of the rollers 38, 39.

The cantilever frame members 30, 31 have their free ends supported in adjusted positions, using the fluid pressure cylinder piston assemblies 40, 41, the movable piston elements of such assemblies 40, 41 being connected respectively to the frame members 30, 31 through the corresponding forked supporting members 42, 43 which are pivotally attached to corresponding frame members 30, 31.

The relatively stationary cylinder elements of the assemblies 40, 41 are attached to the cross-arm 47 which is rigidly secured to the chassis of the distributor by welded framework 49.

The flow of fluid, either compressed air or other fluids such as oil under pressure, may be controlled by suitable valves (not shown) located near the driver's seat 50 to thereby control the height of the outer ends of the cantilever frames 30, 31 and the corresponding conveyor belts 12, 13 mounted thereon. The frames 30, 31 may thus be adjusted in position for travel either over the fields to be planted or for travel over highways of limited width.

In order to prevent undue vibration of the cantilever supported frame members 30, 31, a shock absorbing means may be interposed between the frames 30, 31 and the chassis of the distributor 10. For example, shock absorber means in the form of dashpot piston cylinder assemblies 60, 61 may have their respective piston elements connected to rods 62, 63 which are respectively pivotally mounted on the chassis of the distributor, the corresponding cylinder elements of the shock absorbing means 60, 61 being connected to the corresponding frame members 30, 31 by rods 64, 65 which are pivotally mounted on such frame members 30, 31. Such pivotal mounting on the rods 62, 63, 64 and 65 allows pivotal movement of the frames 30, 31 about the shafts 30A, 31A.

Power for driving the belts 12 and 13 is obtained from the prime mover 67, the gear shift 68 being controlled by, for example, an operator standing on the platform 69 to selectively produce a mechanical driving connection between the prime mover 67 and the belts 12, 13, or to interrupt such driving connection, as occasion demands. When the gear shift 68 is in one of its movable positions, the prime mover 67 drives the pulley 70 over which the driving belt 71 passes. The driving belt 71 passes also over the pulley 72 which is mounted on the same rotatable shaft 73 as is the pulley 74 and the gear 75. A belt 76 passing over the pulleys 74 and 77 is thus driven, the pulley 77 being mounted on the roller shaft 31A to drive the belt 12 in the direction indicated by the arrow 21. Similarly, the belt 13 is driven in the direction indicated by the arrow 20 by power transmitted from the gear 75 through the cooperating gear 78 mounted on the same shaft 79 upon which is mounted the pulley 80 over which the belt 81 passes to drive the pulley 82 on the belt roller shaft 30A.

It is apparent that other mechanical arrangements may be provided to drive the belts 12, 13 outwardly, using the prime mover 67, and the specific arrangement as shown in Figure 7 may be considered typical of one of such arrangements which may be used.

In operation of the distributor, the truck coupled to the distributor is pushed through the field, using the distributor prime mover 81 which may be selectively coupled to the driving treads 82 through the gear shift 84, the gear shift 84 being controlled by an operator seated on the seat 50. The planting material on the truck is fed onto the platform 16, 17 from where substantially one-half of such planting material is fed onto the outwardly moving belt 12, while the other half of such planting material is fed outwardly by the belt 13.

The effective lengths of the belts 12, 13 are of unequal lengths, i. e., the belt 12 has an effective length of one-half of the effective belt 13 to produce the results illustrated in Figures 5 and 6. In Figure 5, in the forward movement of the distributor 10, in the direction indicated by the arrow 90, the planting material is distributed as indicated; then, in the reverse movement of the distributor 10, along the same path in the direction indicated by the arrow 91, the planting material is deposited along different lines even though the distributor retraces its original path. In other words, when the tractor moves in the direction indicated by the arrow 90, planting material is deposited in the rows 93, 94; then, in the return movement of the tractor, along its original path, planting material is deposited along the rows 95, 96.

While we have described above an arrangement for distributing planting material onto the ground, it is readily apparent that, if desired, the apparatus disclosed may be used for gathering material from the ground. In such case, the direction of rotation of the pulley 70 is reversed by manipulating the clutch member 68 to thereby cause the belts 12 and 13 to move oppositely than that shown in Figure 1, to cause the material loaded on the belts to accumulate on the platform 16, 17 from where it may be lifted onto the attached truck.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A material distributor comprising a vehicle having a material receiving chute forwardly and centrally disposed about its longitudinal axis, a truck push rod mounted on said vehicle and extending from said vehicle forwardly past said chute, said push rod having means mounted thereon for quickly attachably and detachably connecting truck from which planting material is loaded into said chute, adjustably positioned cantilever frame members extending substantially laterally from said longitudinal axis and being pivoted on said vehicle below said chute, each of said frame members carrying oppositely movable conveyor belts to distribute material laterally from said vehicle, means mounting the inner ends of said belts to receive said material from said chute, the length of one said belt being substantially equal to one-half the length of the other belt whereby the discharge end of said other belt is located twice the distance from said vehicle which said one belt extends for servicing different areas when the vehicle travels along and retraces the same path.

2. A material distributor comprising a vehicle having a material receiving chute disposed centrally and forwardly thereof, a pair of boom members pivotally mounted on said vehicle and extending substantially laterally thereof, a frame structure extending vertically upwardly from said vehicle, adjustable fluid operated means mounted between said boom members and said frame member to adjustably support the free ends of said boom members different spaced distances with respect to the ground, and hydraulic shock absorbing means extending rearwardly between the ends of said boom members and said vehicle to absorb shock compression forces which otherwise may cause objectionable side sway of said boom members, each of said boom members mounting conveyor belts, means mounting the inner end of each belt to receive material from said chute, the length of one of said belts being substantially equal to one-half the length of the other belt whereby the discharge end of said other belt is located twice the distance from said vehicle which said one belt extends for servicing different areas when the vehicle travels along and retraces the same path.

3. A material distributor comprising a vehicle having a material receiving chute, two oppositely traveling conveyor belts each having its upper material carrying surface moving outwardly and laterally in a direction extending substantially perpendicular with respect to the direction of movement of said vehicle, means mounting the inner ends of said belts to receive said material from said chute, the length of one of said belts being substantially equal to one-half the length of the other belt whereby the discharge end of said other belt is located twice the distance from said vehicle which said one belt extends for servicing different areas when the vehicle travels along and retraces the same path.

4. A material distributor comprising a vehicle having a material receiving chute disposed substantially on the longitudinal axis of said vehicle, adjustably positioned cantilever frame members extending substantially perpendicular from said longitudinal axis on opposite sides of said vehicle, means pivoting said frame members on said vehicle below said chute, each of said frame members carrying oppositely moving material conveyor belts to distribute said material laterally from said vehicle, the inner ends of said conveyor belts being disposed below said chute, means driving said belts with the material carrying surfaces thereof moving outwardly from said longitudinal axis, the length of one of said belts on one side of said longitudinal axis being substantially twice the length of the other one of said belts on the opposite side of said longitudinal axis whereby the discharge end of said other belt is located one-half the distance which said one belt extends for servicing different areas when the vehicle travels along and retraces the same path.

5. The arrangement set forth in claim 3 in which means are provided for selectively driving the material carrying faces of said belts either away or towards the vehicle.

6. The arrangement set forth in claim 4 in which said driving means includes means whereby the direction of movement of the material carrying faces of the belts may be selectively reversed.

7. The arrangement set forth in claim 1 in which said belts have their inner ends disposed below said chute, means for driving the material carrying face of said belts outwardly from said vehicle, said belts extending substantially perpendicular with respect to the longitudinal axis of said vehicle on opposite sides thereof, one of said belts having a length equal substantially to one-half the length of the other one of said belts.

8. The arrangement set forth in claim 1 in which means are provided for driving the material engaging face of said belts outwardly from said vehicle, said means incorporating means whereby the direction of movement of said belts may be selectively reversed in unison.

9. In a mechanism of the character described, a vehicle having a material receiving chute, two conveyor belts each extending outwardly and laterally in a direction substantially perpendicular with respect to the direction of movement of said vehicle, means mounting the inner ends of said belts to receive material from said chute, with the length of one of said belts being substantially equal to one-half the length of the other belt whereby the discharge end of said other belt is located twice the distance from said vehicle which said one belt extends for servicing different areas when the vehicle travels along and retraces the same path.

HENRY J. BALDWIN.
ARTHUR N. BALDWIN.
TETSUO MIHARA.

REFERENCES CITED

The following references are of record in the file of this patent:

UNITED STATES PATENTS

| Number | Name | Date |
| --- | --- | --- |
| 863,202 | Moss | Aug. 13, 1907 |
| 1,177,049 | Peterson | Mar. 28, 1916 |
| 1,371,100 | Larsen | Mar. 8, 1921 |
| 1,504,846 | Tarkington | Aug. 12, 1924 |
| 1,603,634 | Nelson | Oct. 19, 1926 |
| 1,876,568 | Carlson | Sept. 13, 1932 |
| 2,321,387 | Jackson | June 8, 1943 |
| 2,384,385 | Madeira | Sept. 4, 1945 |
| 2,386,192 | Brinhall | Oct. 9, 1945 |
| 2,481,860 | Miller | Sept. 13, 1949 |
| 2,507,252 | Hoover | May 9, 1950 |